(No Model.)

A. W. LAUGHLIN.
CHECK HOOK.

No. 541,764. Patented June 25, 1895.

Witnesses:
F. G. Fischer
G. Y. Thorpe

Inventor
A. W. Laughlin,
By Higdon & Higdon
Attys.

UNITED STATES PATENT OFFICE.

ALEXANDER W. LAUGHLIN, OF ODESSA, MISSOURI.

CHECK-HOOK.

SPECIFICATION forming part of Letters Patent No. 541,764, dated June 25, 1895.

Application filed March 22, 1895. Serial No. 542,765. (No model.)

*To all whom it may concern:*

Be it known that I, ALEXANDER W. LAUGHLIN, of Odessa, Lafayette county, Missouri, have invented certain new and useful Improvements in Terret-Hook Devices for Harness, of which the following is a full, clear, and exact description, reference being had to the accompanying drawings, forming a part thereof.

My invention relates to terret-hook devices for harness, and my object is to provide a device of this character to which may be conveniently and quickly attached the crupper, back, and hitching straps of the harness.

A further object of the invention is to provide a device for reliably securing the check-rein, and for quickly and easily releasing the same when required.

A still further object of the invention is to provide a terret-hook device which is simple, strong, durable, and inexpensive of construction, and of ornamental and attractive appearance.

With these objects in view, the invention consists in certain novel and peculiar features of construction and combinations of parts, as will be hereinafter described and claimed.

In order that the invention may be fully understood, I will proceed to describe it with reference to the accompanying drawings, in which—

Figure 1:
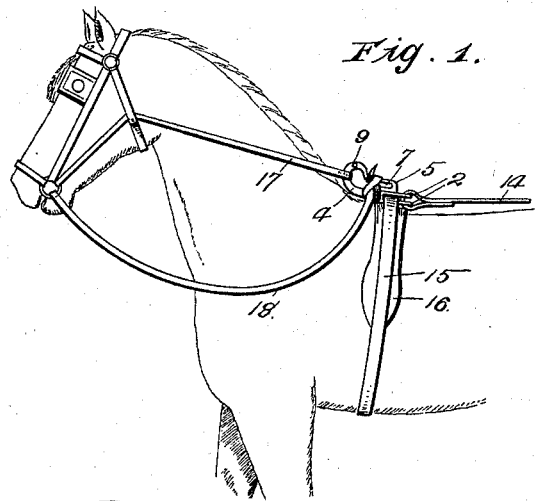
Figure 2:
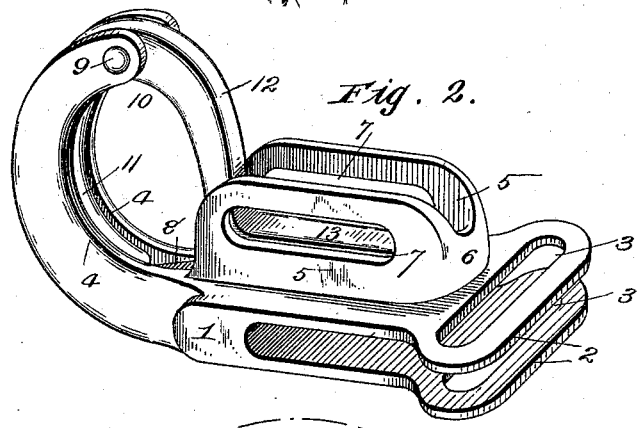
Figure 3:
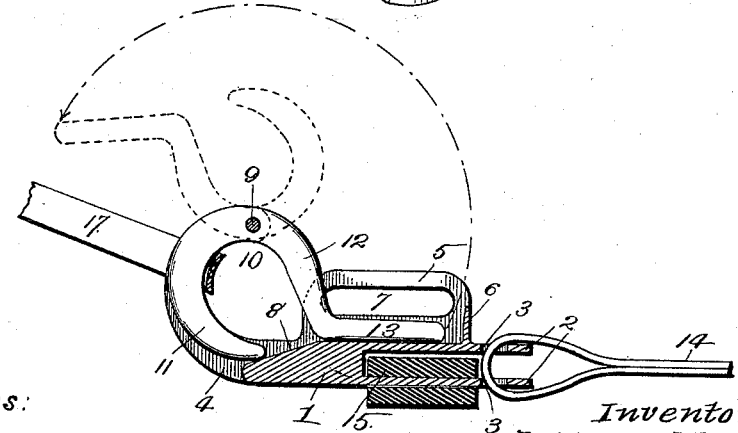

Figure 1 is a view showing my improved terret-hook device in operative position relative to a horse and the harness thereon. Fig. 2 is a perspective view on an enlarged scale of my improved terret-hook device. Fig. 3 is a vertical longitudinal section of the same, and showing connected thereto the crupper-strap, the back-strap, and the check-rein.

In the said drawings, 1 designates the body-portion of my improved device, which in contour viewed from above is approximately rectangular, and viewed from the side is bifurcated or forked to form the rearwardly-projecting parallel arms 2, 2, and a rearwardly opening space or slot between said arms. Said arms are laterally widened, preferably, as shown clearly in Fig. 2, and are slotted transversely nearly their entire width, as shown at 3, 3, to form a double loop. From the front end of the body-portion 1, projects upwardly the parallel shields or arms 4, 4, which are approximately semicircular, and have their concaved edges disposed toward the rear. Projecting vertically upward from the upper side of the body-portion 1, and extending longitudinally thereof, in the plane of the shields or arms 4, are the ears or lugs 5, which at their rear ends, contiguous to the slots 3, are connected together, as shown at 6, and said arms 5 are provided with longitudinal slots 7, which form conjointly a double loop, and that portion of the body-portion between the lugs 5 and extending forwardly therefrom is beveled downwardly, as shown at 8.

Pivotally mounted upon the transverse bolt 9, connecting the upper ends of the semicircular shields or arms 4, and arranged about vertically above the front end of the inclined surface 8 of the body-portion, is a hook 10. Said hook is approximately circular, the forward or hook-portion proper curving downwardly and rearwardly on the line of and between the said semicircular shields or arms, and resting at its free end upon the inclined surface 8 of the body-portion, as shown at 11. From said pivotal point the portion 12 extends downwardly to the body-portion between the front ends of the lugs 5, and then continues in a horizontal plane between said lugs for about the length of the slots 7 below which it lies, as shown at 13.

When this device occupies its operative position upon the saddle of the harness, it is secured in such position by the crupper-strap 14, which engages the double loop formed conjointly by the oppositely-disposed slots 3, and by the back-strap 15, which rests upon the saddle 16 in the usual manner, and embraces snugly the lower arm 2 of the body-portion, being slipped into position before the crupper-strap is secured, as will be readily understood.

To now properly secure the check-rein, the hook 10 is grasped and pivotally operated in the direction indicated by the arrow to the position shown in Fig. 3. The loop of the check-rein 17 is now slipped over the point or free end of the hook, which is then grasped by the portion 13, and forced in the reverse direction to that indicated by said arrow until the point or free end of the hook comes in contact with the beveled surface 8, or so close to said surface that it will be impossible for the check-rein to slip out of engagement with the hook, and the arm 13 comes in contact with the body-portion between said lugs 5. It will now be apparent that the pressure upon the check-rein is sustained by the shields or arms 4, and tends to clamp the hook firmly and reliably in the position shown in full lines in the drawings, so that it will be absolutely impossible for said hook and checkrein to become accidentally disengaged. For a further precaution, the hitching-strap 18 may be passed through the oppositely-disposed slots 7, and tied, as shown in Fig. 1, so that by bridging the space between said lugs above the said arm 13, it will be absolutely impossible for the check-rein to become disconnected without first untying said hitching-strap.

While I have shown no modifications of this device, it is to be understood that I may make slight changes in the form, arrangement and proportion of parts without departing from the essential spirit and scope or sacrificing any of the advantages of my invention, which, combining cheapness with simplicity and strength, will be found to possess decided advantages over any construction in use at the present time that I am aware of.

One great advantage this device possesses over the ordinary open hook, in addition to the function hereinbefore mentioned. It is intended to keep the check-lines on a double team from getting into the hook, from any cause whatever. For example—in walking or driving when the usual hook is employed, the pulling of the lines across the horses' backs may and often does cause them to become so caught that control of the team is lost,—or one horse may lunge forward or become frightened and jerk the line into the hook, whereby the driver loses control of his team.

Having thus described my invention, what I claim as new, and desire to secure by Letters Patent, is—

1. A terret-hook device for harness, comprising a body-portion terminating at its rear end in a double-loop, with a rearwardly-disposed slot between them, and at its upper end in a pair of parallel curved shields or arms, a hook pivotally mounted upon said arms having its free end or point contiguous to or against the front end and upper surface of the body-portion, and its opposite end bearing upon the upper side of said body-portion, and parallel lugs projecting upwardly at the opposite side of said arm and provided with oppositely-disposed slots, substantially as set forth.

2. A terret-hook device for harness, comprising a body-portion terminating at its rear end in a double-loop, with a rearwardly-disposed slot between them, and at its upper end in a pair of parallel curved shields or arms, a hook pivotally mounted upon said arms having its free end or point contiguous to or against the front end and upper surface of the body-portion, and its opposite end bearing upon the upper side of said body-portion, and parallel lugs projecting upwardly at the opposite side of said arm and provided with oppositely-disposed slots, in combination with a crupper-strap engaging the double loop consisting of oppositely-disposed slots at the rear end of the body-portion, a back-strap embracing said body-portion and extending through the slot formed between said double loops, a check-rein engaging the curved shield or arms and the front portion of the hook, and a hitching-strap bridging the space between said upwardly projecting lugs above the rear arm of said hook, and engaging the oppositely-disposed slots of said lugs, substantially as and for the purpose set forth.

In testimony whereof I affix my signature in the presence of two witnesses.

ALEXANDER W. LAUGHLIN.

Witnesses:
M. R. REMLEY,
S. B. FALOR.